(12) United States Patent
Kitamura et al.

(10) Patent No.: US 6,504,727 B1
(45) Date of Patent: Jan. 7, 2003

(54) EARPHONE JACK HOLDING DEVICE

(75) Inventors: Toshiyasu Kitamura, Kanagawa (JP); Teruo Nanmoku, Kanagawa (JP); Taichi Tabata, Kanagawa (JP); Hideo Ono, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/694,694

(22) Filed: Oct. 23, 2000

(30) Foreign Application Priority Data

Oct. 26, 1999 (JP) .......................... 11-304599

(51) Int. Cl.⁷ .................... H05K 9/00; H05K 7/00; H04B 7/26
(52) U.S. Cl. .................. 361/800; 361/801; 361/814; 361/816; 381/374; 174/35 R; 439/607
(58) Field of Search ................ 361/800, 801, 361/814, 816, 818; 174/35 R; 381/183, 187, 370, 374; 439/607, 608, 59

(56) References Cited

U.S. PATENT DOCUMENTS 5,422,957 A * 6/1995 Cummins .................. 381/183
5,919,052 A * 7/1999 Ho ............................. 439/83

* cited by examiner

Primary Examiner—Jayprakash N. Gandhi
(74) Attorney, Agent, or Firm—Pearne & Gordon LLP

(57) ABSTRACT

An earphone jack is fixed on a printed circuit board by soldering as well as a first holding rib and a second holding rib for holding in the horizontal direction and a third holding rib for holding in the perpendicular direction with respect to the printed circuit board are provided on a shield case. The shield case is held in the perpendicular direction with respect to the printed circuit board by a fourth holding rib provided on the case.

6 Claims, 2 Drawing Sheets

EARPHONE JACK HOLDING DEVICE

BACKGROUND OF THE INVENTION

The present invention relates to an earphone jack holding device, in particular, it relates to that without the risk of causing troubles with respect to the external stress as well as capable of being stabilized electrically.

An earphone jack is provided in a portable terminal device such as a portable phone and a PHS (personal handy phone system). Due to limitation in the structure of the device, the earphone jack is mounted on a flexible printed circuit board (FPC) or a printed circuit board in most cases. Since the earphone jack is to be used with an earphone plug inserted therein, it is conceivable that the earphone jack is wrenched thereby, and thus the earphone jack needs to be held by any means.

Particularly in the case of the structure with the earphone jack mounted on a printed circuit board, if it is wrenched with the earphone plug inserted, the stress is directly conveyed to a terminal soldered with the printed circuit board of the earphone jack, and thus a problem arises in that troubles such as solder cracking and solder peel-off can be generated.

An example of the conventional earphone jack holding device shown in FIGS. 4A and 4B will be explained. FIG. 4A is a side view of a conventional portable phone device, with an earphone jack 31 provided sideways with respect to a case 32. FIG. 4B is a cross-sectional view of a portable terminal device such as a portable phone device cut in the longitudinal direction for showing only the configuration of the earphone jack holding part.

In FIG. 4B, the earphone jack (ordinarily abbreviated as H. S. J.) 31 is fixed on a printed circuit board 33 by soldering as well as it is held by holding ribs 34 of the case 32.

In the case of the configuration, if it is wrenched with the earphone plug inserted, even though the holding ribs 34 of the case 32 are provided, it is insufficient and the stress thereof is directly conveyed to a terminal of the earphone jack 31 soldered with the printed circuit board 33 so that troubles such as solder cracking and solder peel-off are generated.

SUMMARY OF THE INVENTION

In order to solve the conventional problems, an object of the invention is to provide an earphone jack holding device without the risk of causing troubles with respect to the external stress such as wrenching of an earphone plug as well as with a configuration capable of being stabilized electrically.

A first aspect of the invention is an earphone jack holding device comprising an earphone jack, a shield case, and a printed circuit board for mounting and fixing the earphone jack and the shield case, wherein the earphone jack is fixed on the printed circuit board and the shield case is further fixed thereon such that the earphone jack is held by the shield case in the horizontal direction and the perpendicular direction with respect to the printed circuit board.

According to the configuration, since the earphone jack can be positioned accurately with respect to the printed circuit board by being held by the shield case in the state being closely closed so as to prevent leakage of electromagnetic waves, generation of troubles by the external stress such as wrenching can be prevented.

Moreover, a second aspect of the invention is an earphone jack holding device comprising a printed circuit board with a main body case, a shield case, and an earphone jack mounted thereon, wherein first and second holding ribs for holding the earphone jack in the horizontal direction with respect to the printed circuit board as well as a third holding rib for holding the same in the perpendicular direction with respect to the printed circuit board are provided in the shield case, and a fourth holding rib for holding the earphone jack and the shield case in the direction perpendicular to the printed circuit board is provided in the main body case.

According to the configuration, generation of troubles by the external stress such as wrenching of an earphone plug can be prevented.

Furthermore, a third aspect of the invention is the earphone jack holding device according to the second aspect, wherein any of the first to third holding ribs provided in the shield case is in contact with an earth terminal of the earphone jack.

According to the configuration, generation of troubles by the external stress such as wrenching of an earphone plug can be prevented as well as an electrically stable structure can be provided.

Moreover, a fourth aspect of the invention is the earphone jack holding device according to the second or third aspect, wherein the shield case is a resin molded product applied with a conduction treatment such as plating and metal deposition.

According to the configuration, an electrically stable structure can be provided.

Furthermore, a fifth aspect of the invention is the earphone jack holding device according to the second or third aspect, wherein a taper part is provided in the first to third holding ribs provided in the shield case, for guiding the earphone jack at the time of mounting the shield case onto the printed circuit board with the earphone jack mounted.

According to the configuration, the shield case can easily be mounted on the printed circuit board with the earphone jack mounted thereon.

Moreover, a sixth aspect of the invention is a portable terminal device comprising the earphone jack holding device according to any of the first to fifth aspect.

Since the earphone jack being stabilized electrically without generation of troubles by the external stress is provided, a portable terminal device without the risk of failure can be provided.

DETAILED DESCRIPTION OF THE PREFERRED EMBODIMENT

Hereinafter, an embodiment of the invention will be explained with reference to FIGS. 1 to 3.

Figure 1:
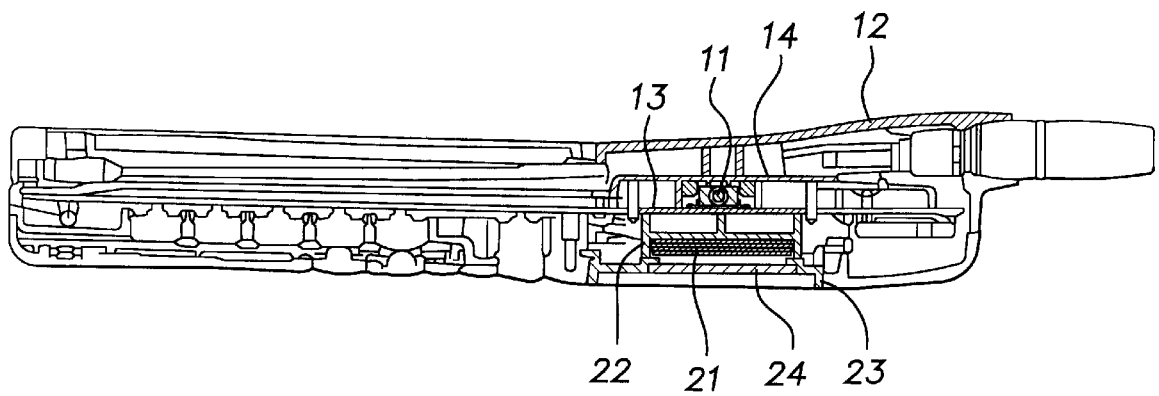
FIG. 1 is a cross-sectional view of a portable phone device according to an embodiment of the invention.

FIG. 1 is a cross-sectional view of a portable phone device according to an embodiment of the invention, with a configuration comprising an earphone jack 11 fixed on a printed circuit board 13, a shield case 14 fixed thereon, and a case 12 pressuring the shield case 14.

Figure 2:
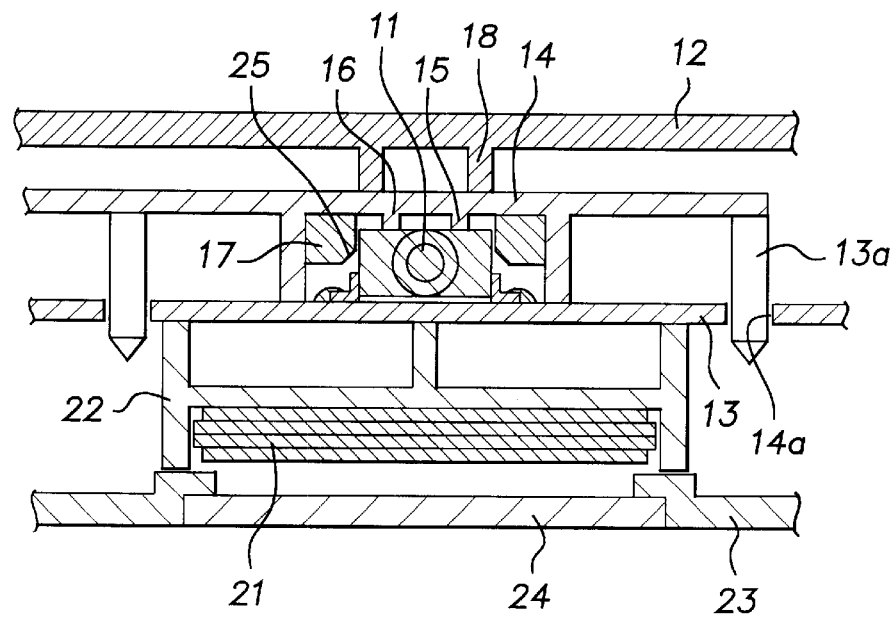
FIG. 2 is a cross-sectional view of a portable terminal device such as the portable phone device of the embodiment of the invention cut in the longitudinal direction so as to show only the configuration of an earphone jack holding part.

FIG. 2 is a cross-sectional view of a portable terminal device such as the portable phone device of the embodiment of the invention cut in the longitudinal direction so as to show only the configuration of an earphone jack holding part.

In FIG. 2, the earphone jack holding part is provided on the rear side of a liquid crystal display part of the portable terminal device. The liquid crystal display part of the portable terminal device comprises a liquid crystal display element (LCD) 21 held by an LCD holder 22, and an LCD panel 24 provided at the display position of a cover 23. The LCD holder 22 is mounted and fixed on the printed circuit board 13.

In FIG. 2 the earphone jack (ordinarily abbreviated as H. S. J.) 11 is fixed on the printed circuit board 13 by soldering as well as a third holding rib 17 for holding in the horizontal direction and a first holding rib 15 and a second holding rib 16 for holding in the perpendicular direction with respect to the printed circuit board are provided on the shield case 14.

In the shield case 14, positioning pins 13a are projected toward the printed circuit board 13 for fitting into positioning holes 14a for the shield case preliminarily provided on the printed circuit board 13 so as to be accurately positioned and fixed.

The shield case 14 is held in the perpendicular direction with respect to the printed circuit board by a fourth holding rib 18 provided on the case 12.

Here, since the first holding rib 15, the second holding rib 16, and the third holding rib 17 serve as a stopper part for limiting the movement of the earphone jack 11 in the lateral direction, even in the case the device is wrenched with an earphone plug inserted, it can be held in the horizontal direction and the perpendicular direction with respect to the printed circuit board by the shield case 14 so that the wrenching force is balanced with the reaction force of the shield case 14 so as not to directly convey the stress onto the terminal of the earphone jack 11 soldered with the printed circuit board 13, and thus generation of troubles such as solder cracking and solder peel-off can be prevented.

A taper part 25 for guiding the earphone jack 11 at the time of mounting the shield case 14 onto the printed circuit board 13 with the earphone jack 11 mounted is provided on the first to third holding ribs (in FIG. 2, it is illustrated only on the third holding rib 17).

Figure 3:
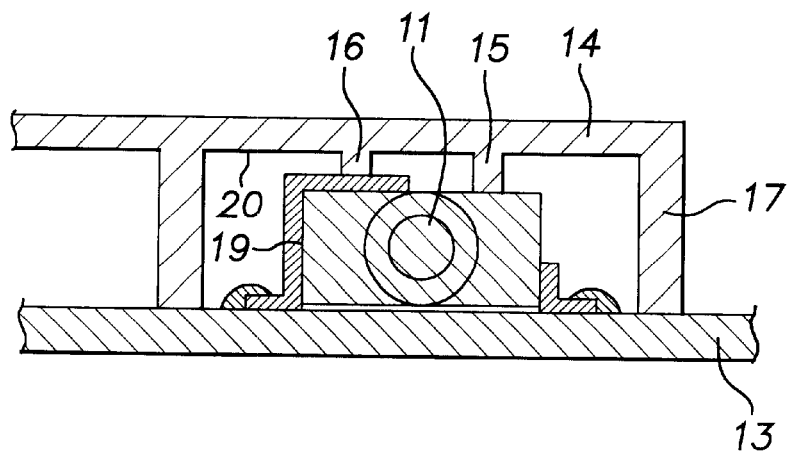
FIG. 3 is a cross-sectional view of the portable terminal device such as the portable phone device of the embodiment of the invention cut in the longitudinal direction at a position different from that of FIG. 1 so as to show only the configuration of an earphone jack holding part.
Figure 4A:
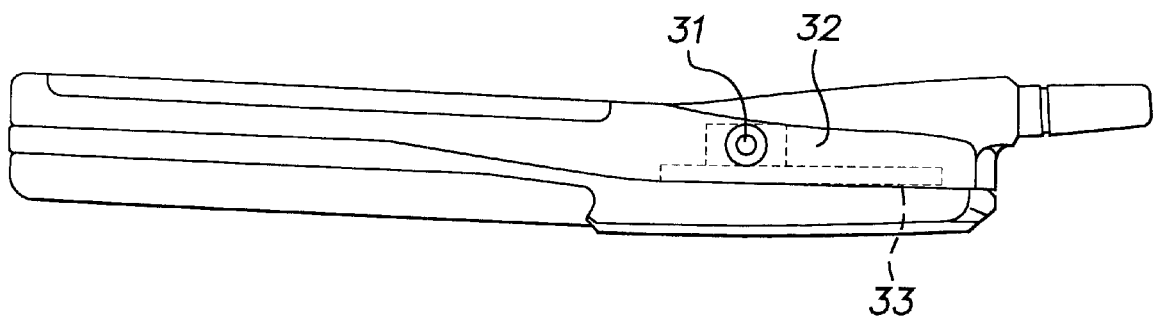
FIG. 4A is a side view of a conventional portable phone device.
Figure 4B:
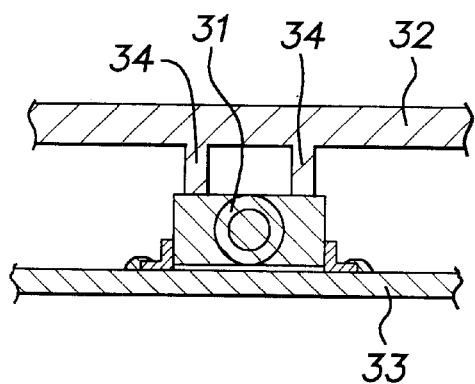
FIG. 4B is a cross-sectional view of a portable terminal device such as a portable phone device cut in the longitudinal direction so as to show only the configuration of an earphone jack holding part.

FIG. 3 is a cross-sectional view of the portable terminal device such as the portable phone device of the embodiment of the invention cut in the longitudinal direction at a position different from that of FIG. 2 so as to show only the configuration of an earphone jack holding part.

In FIG. 3, the earphone jack 11 is fixed on the printed circuit board 13 by soldering as well as one of the soldered terminals is provided as a ground terminal 19, surrounding the earphone jack 11 by the half circumference thereof. The second holding rib 16 provided on the shield case 14 is contacted with the ground terminal 19 such that the movement of the earphone jack 11 in the lateral direction can be limited in cooperation with the stopper part of the third holding rib 17 shown in FIG. 2 as well as the earth potential can be strengthened by sufficiently ensuring the contact with the ground terminal 19 so as to stabilize the electric characteristics. Although the second holding rib 16 is contacted with the earth terminal in the above-mentioned description, it can be the first or third holding rib. Moreover, the side of the shield case 14 facing to the earphone jack 11 side is applied with plating 20 so as to improve the shielding effect by the contact with the earth terminal. It may be applied with a conduction treatment, such as metal deposition. The shield case may be a resin molded product applied with a conduction treatment such as plating and metal deposition.

As heretofore mentioned, since the first aspect of the invention is an earphone jack holding device comprising an earphone jack, a shield case, and a printed circuit board for mounting and fixing the earphone jack and the shield case, wherein the earphone jack is fixed on the printed circuit board and the shield case is further fixed thereon such that the earphone jack is held by the shield case in the horizontal direction and the perpendicular direction with respect to the printed circuit board, the earphone jack can be positioned accurately with respect to the printed circuit board by being held by the shield case in the state being closely closed so as to prevent leakage of electromagnetic waves, and thus an effect of preventing generation of troubles by the external stress such as wrenching can be achieved.

Moreover, since the second aspect of the invention is an earphone jack holding device comprising a printed circuit board with a main body case, a shield case, and an earphone jack mounted thereon, wherein a third holding rib for holding the earphone jack in the horizontal direction with respect to the printed circuit board as well as a first holding rib and a second holding rib for holding the same in the perpendicular direction with respect to the printed circuit board are provided in the shield case, and a fourth holding rib for holding the earphone jack and the shield case in the direction perpendicular to the printed circuit board is provided in the main body case, an effect of preventing generation of troubles by the external stress such as wrenching of an earphone plug can be achieved.

Furthermore, since the third aspect of the invention is the earphone jack holding device according to the second aspect, wherein any of the first to third holding ribs provided in the shield case is in contact with an earth terminal of the earphone jack, an effect of preventing generation of troubles by the external stress such as wrenching of an earphone plug as well as an effect of providing an electrically stable structure can be achieved.

Moreover, since the fourth aspect of the invention is the earphone jack holding device according to the second or third aspect, wherein the shield case is a resin molded product applied with a conduction treatment such as plating and metal deposition, an effect of providing an electrically stable structure can be achieved.

Furthermore, since the fifth aspect of the invention is the earphone jack holding device according to the second or third aspect, wherein a taper part is provided in the first to third holding ribs provided in the shield case, for guiding the earphone jack at the time of mounting the shield case onto the printed circuit board with the earphone jack mounted, an effect of easily mounting the shield case on the printed circuit board with the earphone jack mounted thereon can be achieved.

Moreover, since the sixth aspect of the invention is a portable terminal device comprising the earphone jack holding device according to any of the first to fifth aspect so that the earphone jack being stabilized electrically without generation of troubles by the external stress is provided, an effect of providing a portable terminal device without the risk of failure can be achieved.

What is claimed is:

1. An earphone jack holding device comprising:
   a main body case;
   a printed circuit board;
   an earphone jack mounted on the printed circuit board;
   a shield case fixed on the printed circuit board;
   a first holding rib provided in the shield case for holding the earphone jack in the horizontal direction with respect to the printed circuit board;
   a second holding rib provided in the shield case for holding the earphone jack in the perpendicular direction with respect to the printed circuit board; and
   a third holding rib provided in the main body for holding the earphone jack and the shield case in the direction perpendicular to the printed circuit board.

2. The earphone jack holding device according to claim 1, wherein one of the first and second holding ribs provided in the shield case is in contact with an earth terminal of the earphone jack.

3. An earphone jack holding device according to claim 1, wherein the shield case is a resin molded product applied with a conduction treatment such as plating and metal deposition.

4. An earphone jack holding device according to claim 1, further comprising a taper part provided in the first to second holding ribs provided in the shield case, for guiding the earphone jack at the time of mounting the shield case onto the printed circuit board with the earphone jack mounted.

5. An earphone jack holding device according to claim 1,
   wherein the shield case is provided above the print board and the earphone jack,
   wherein the main body case is provided above the shield case,
   wherein the first holding rib is contact with an upper surface of the earphone jack, the second holding rib is contact with an upper surface of the printed circuit board, the third holding rib is contact with the shield case.

6. A portable terminal device comprising:
   a main body case;
   a printed circuit board;
   an earphone jack mounted on the printed circuit board;
   a shield case fixed on the printed circuit board;
   a first holding rib provided in the shield case for holding the earphone jack in the horizontal direction with respect to the printed circuit board;
   a second holding rib provided in the shield case for holding the earphone jack in the perpendicular direction with respect to the printed circuit board; and
   a third holding rib provided in the main body for holding the earphone jack and the shield case in the direction perpendicular to the printed circuit board.

* * * * *